July 15, 1924.

F. L. SCOTT 1,501,244

TRIMMER ATTACHMENT FOR LAWN MOWERS

Filed Sept. 13, 1921  2 Sheets-Sheet 1

FLOYD L. SCOTT, INVENTOR.

BY  Jesse R. Stone

ATTORNEY.

FLOYD L. SCOTT, INVENTOR.

BY Jesse R. Stone

ATTORNEY.

Patented July 15, 1924.

1,501,244

UNITED STATES PATENT OFFICE.

FLOYD L. SCOTT, OF HOUSTON, TEXAS.

TRIMMER ATTACHMENT FOR LAWN MOWERS.

Application filed September 13, 1921. Serial No. 500,296.

*To all whom it may concern:*

Be it known that I, FLOYD L. SCOTT, a citizen of the United States, residing at Houston, Harris County, Texas, have invented a certain new and useful Improvement in Trimmer Attachments for Lawn Mowers, of which the following is a full, clear, and exact description, such as will enable others skilled in the art to which it appertains to make and use the same.

My invention relates to a trimmer attachment for lawn mowers.

The object of my invention is to provide an attachment for lawn mowers which will enable the mower to cut or trim off the grass overlying the edges of walks.

Another object is to so construct such an attachment that it may be conveniently and quickly attached or detached from the ordinary types of lawn mowers now in use.

It is commonly the case, where a lawn has been mowed by any of the usual types of lawn mowers, that a fringe of grass is left lying along the edge of the walks. This grass lies too low on the walk to be caught by the rotary blades of the mower. It hence becomes necessary to go along the walks with some special trimming device, commonly a pair of lawn shears, and somewhat laboriously cut the fringe of grass next to and overlying the walks. This is necessary especially where Bermuda grass or other similar creeping lawn grass is encountered. To overcome this necessity I have devised an attachment for ordinary lawn mowers which will raise the grass up from the edge of the walks into such position that the cutters of the mower will engage the grass and cut it.

Figure 1:
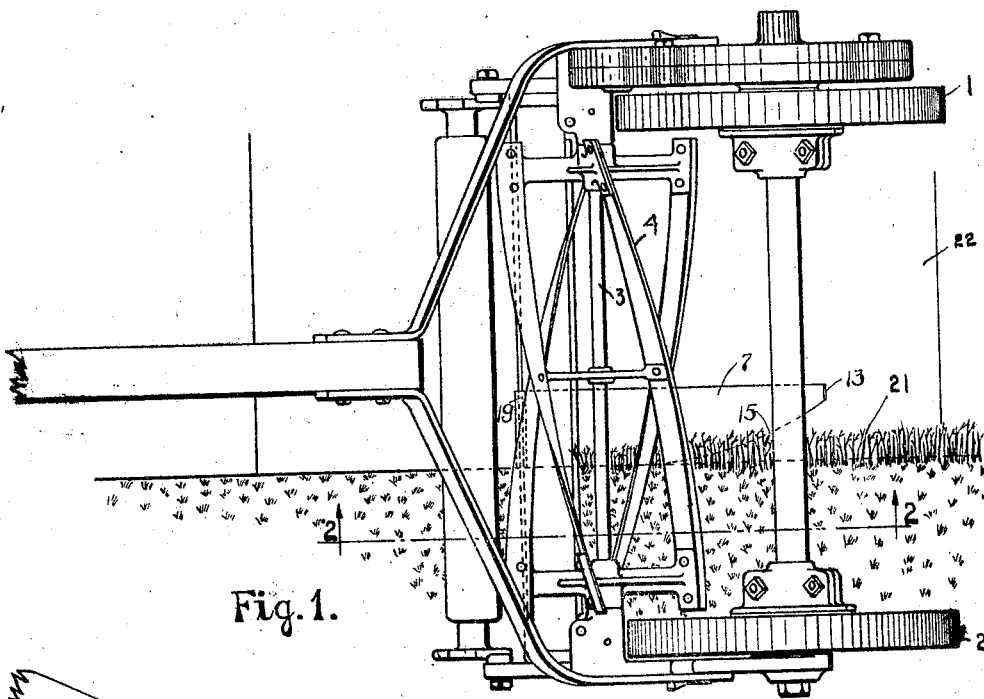
Figure 2:
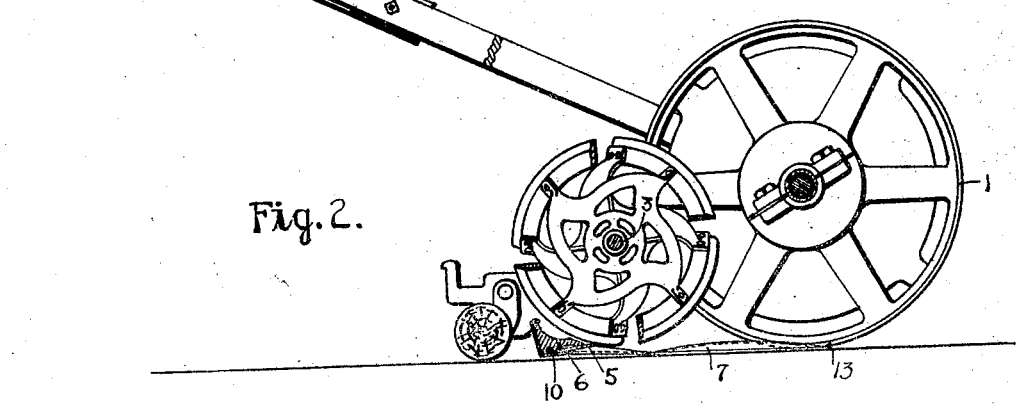
Figure 3:
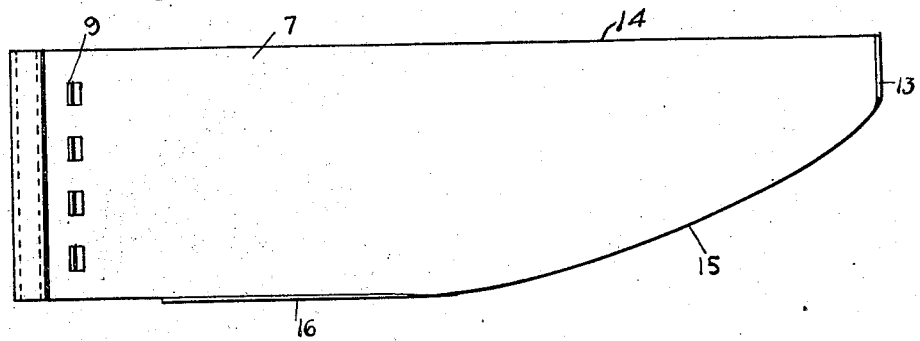
Figures 4, 8:
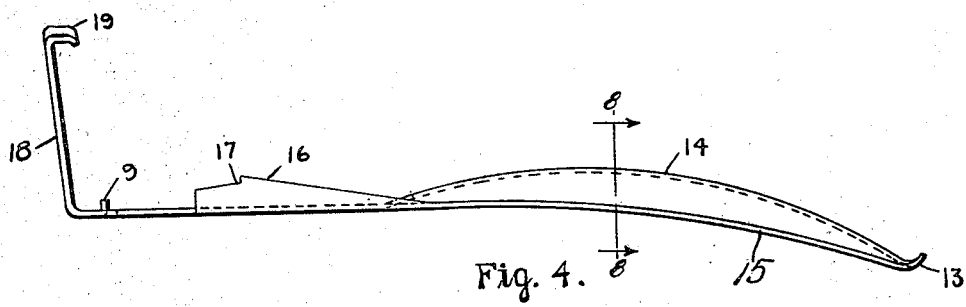
Figure 5:
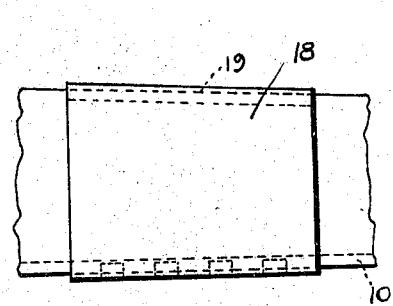
Figure 7:
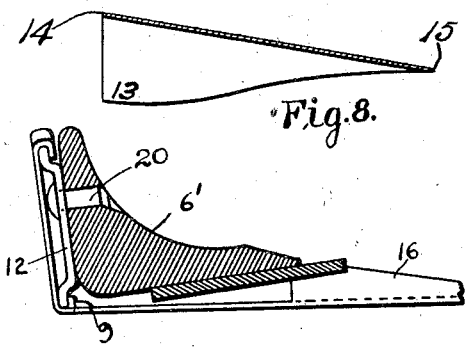
Figure 6:
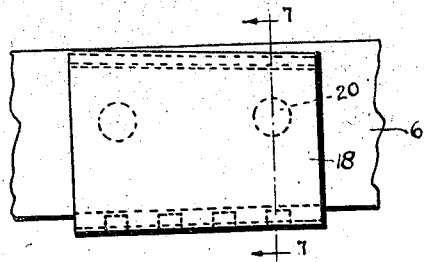

Referring to the drawing herewith wherein the preferred embodiments of my device are illustrated, Fig. 1 is a top plan view of a common make of lawn mower, showing my attachment thereon. Fig. 2 is a transverse section on the plane 2—2 of Fig. 1 looking in the direction of the arrows. Fig. 3 is a top plan view of my attachment, shown on an enlarged scale. Fig. 4 is a side elevation thereof. Fig. 5 is an end elevation of my device, showing the means by which it is attached to the lawn mower. Figs. 6 and 7 are end and side views, respectively, showing a different means of attachment. Figure 8 is a transverse section on the line 8—8 of Figure 4. Like numerals of reference are applied to like parts in all the views My attachment is intended to be used after the lawn has been mowed with any common type of lawn mower, although it is obvious that it will function the same if the trimming is done before the lawn is mowed. A mower of a common make is shown in Figs. 1 and 2. It comprises a pair of drive wheels 1 and 2, the rotation of which serves, through intermediate gears, to rotate a shaft 3 to which are secured blades 4 arranged somewhat spirally, as will be noted, relative to the rotating shaft 3. As these blades rotate they come in contact, on the side next the ground, with the edge of a stationary blade 5. The blades rotating in clockwise direction, as seen in Fig. 2, will bring the grass into contact with the edge of the blade 5 where the grass will be caught between the rotating and stationary blades and thus severed. The blade 5 is secured to a supporting bar 6 extending transversely across the frame of the mower. In one or more of the popular types of lawn mowers there is a longitudinal groove or recess 10 on the lower side of the supporting bar 6. This may be used, as will be later shown, as a means whereby the attachment is secured to the said support.

The construction of my attachment is shown best in Figs. 3, 4 and 5. It comprises an elongated plate or blade 7, the forward end of which is curved downwardly. The forward tip edge is slightly recurved upwardly at 13. This forward curved end is narrower than the rearward end, one corner being curved or rounded off from an intermediate point on the forward edge to one of the side edges thereof, as shown at 15. This rounded edge is adapted in use to rest on the surface of the walk, so as to better insert itself under the grass and thus lift the grass overlying the edge of the said walk. The opposite side of the blade from the rounded edge is bowed upwardly somewhat, as is shown at 14. From this convex surface the blade inclines downwardly toward the curved edge 15, thus acting to more efficiently hold the curved edge in line contact with the walk. To the rear of the curved portion 15, the edge of the blade has an upstanding flange or deflector 16 which is inclined upwardly toward the rear, as shown in Fig. 4, and provided with a backwardly inclined notch 17 into which the edge of the blade 5 is adapted to fit, as shown in Fig. 2. The rear end of the plate is formed for attachment to the supporting bar 6. For this purpose it is bent upwardly at 18 and then inwardly at 19, thus providing an attaching means of sufficient width to receive the rear edge of the supporting bar 6. Spaced inwardly, a slight distance from the upstanding portion 18, I provide a series of short lugs or projections 9, which are adapted to fit within the longitudinal groove 10 in the supporting bar, previously described. In the usual type of mower, the supporting bar 6 is tapered slightly from its central point toward both ends. To accommodate this taper, I have also tapered the upper edge of the portion 19 of the attaching member, as shown in Fig. 5, making the same narrower at one side. Thus, when the blade is to be attached to the support, the attaching end of the blade is hooked over the smaller end of the supporting bar 6, and is then moved toward the central portion of the bar so that it will come in close frictional contact with the bar toward the enlarged central part of the same. In this position it will be held securely against movement, and the blade 5 will seat within the notch 17 in the attachment.

In Figs. 6 and 7, I have indicated another means of attaching my device to the supporting bar of a mower, where said bar does not have the longitudinal groove 10 formed therein. In this construction I attach to the rear side of the supporting bar 6' a small bracket 12. This bracket comprises a thin strip of metal, the upper and lower edges of which are curved outwardly, and extended laterally parallel with the main body of the bracket. This bracket is secured to the bar by means of rivets 20, or other similar attaching means, and as will be obvious, may even be made integral therewith. I contemplate forming the upper edge of this bracket in a slightly inclined position longitudinally thereof so that one end will be narrower than the other, as shown in Fig. 6. In this construction, my attachment may be secured thereto in somewhat the same manner as in the embodiment previously described. The attachment will be fitted over the small end of the bracket, and when moved laterally toward the larger end of the bracket, it will be wedged into close contact with the bracket and be held firmly. In this modification the upstanding lugs 9 in the attachment will be formed somewhat closer to the rear end of the attachment, so that it will closely receive the lower edge of the bracket.

In the use of my attachment, the mower is operated in the usual manner and when the lawn has been mowed, leaving the usual overlying fringe of grass 21 along the edge of the walk, I place my attachment upon the supporting bar 6 of the mower, so that it will assume about the position shown in Fig. 1, the forward end being curved downwardly so that it will be forced strongly against the surface of the walk shown at 22. The slight curve 13 in the forward end of the blade will serve to raise the blade over any projections or uneven places in the walk. The curved or rounded edge 15 will be received under the lower ends of the blades of grass along the walk and will serve to force the grass upwardly; having an action somewhat like that of a plow. The inclined portion 16 on the edge adjacent the grass will cause the grass to be raised up to the level of the blade 5 of the mower, and in this position it will be engaged by the rotating blades 4 and severed.

The particular construction of my attachment makes it easy and simple to manufacture and makes it quickly attachable and detachable from the mower. When it is employed in trimming the grass along the edges of walks in the manner described, it will be obvious that the mower may be operated at the usual speed and it has been found in practice that the grass will be cut off uniformly and evenly, and in a manner superior to the operation of the usual trimming devices. The cost of an attachment such as this would be not greater than that of the usual trimming means and would serve the purpose much more conveniently and efficiently. While I have shown my attachment applied to a lawn mower, it is obvious that it could be used in connection with any ordinary grass cutter, and I do not limit my invention in its application to lawn mowers of the kind shown.

Having thus described my device, the further objects and advantages of which will be clear to one skilled in the art, what I claim as new and desire to protect by Letters Patent, is:

1. An attachment for grass cutters comprising an elongated plate, the forward end of which is curved downwardly, said plate having a rounded corner at one side and an upstanding deflector to the rear of said curved end, and means to secure said plate to a supporting bar on the cutter.

2. An attachment for grass cutters comprising a forwardly extending approximately horizontal plate, one forward corner of which is curved slightly downward, and rounded off, means to attach said plate to said cutter comprising a tapered supporting bar on said cutter, and a tapered member on said plate adapted to slidably engage said tapered support.

3. An attachment for grass cutters comprising an approximately horizontally arranged plate extending forwardly in advance of the cutters, said plate having a rounded corner on the forward end thereof, the said forward end and rounded corner, being inclined slightly downwardly, and one side being curved upwardly to form an upstanding deflector to assist in raising grass into position to be engaged by said cutter.

4. An attachment for grass cutters comprising an elongated member extending forwardly in advance of the cutters from a point beneath the same, said plates having an upwardly inclined deflector on one side acting to raise the grass into reach of said cutters, and means to attach said member to the frame of the cutter.

5. In a grass cutter having rotating blades, a transverse supporting bar beneath said blades, a plate having a downwardly-inclined forward end adapted to engage beneath the grass, and an upwardly inclined deflector on one side thereof.

6. An attachment for grass cutters, comprising a forwardly projecting flattened plate, said plate being approximately horizontal and held resiliently downwardly at its forward end and means for attaching said plate to said cutter so that said plate will be introduced under the grass being cut, in such manner as to raise said grass into the path of the cutters.

7. An attachment for grass-cutters having rotating blades thereon, comprising a flattened forwardly extending plate attached at a point beneath said cutters, said plate being held resiliently downward at the forward end, one side thereof being inclined upwardly toward said blades so as to bring the grass within the range of said blades.

In testimony whereof, I hereunto affix my signature this the 10th day of September, A. D. 1921.

FLOYD L. SCOTT.